United States Patent [19]

Seaman

[11] Patent Number: 5,790,808
[45] Date of Patent: Aug. 4, 1998

[54] ACTIVE TOPOLOGY MAINTENANCE IN RECONFIGURING BRIDGED LOCAL AREA NETWORKS WITH STATE TRANSITION WITH FORGETTING INTERVAL

[75] Inventor: Michael J. Seaman, Santa Clara, Calif.

[73] Assignee: 3 COM, Santa Clara, Calif.

[21] Appl. No.: 498,944

[22] Filed: Jul. 6, 1995

[51] Int. Cl.[6] .................................................. G06F 13/14
[52] U.S. Cl. ................................ 395/200.53; 395/200.72
[58] Field of Search ........................ 395/200.01, 200.02,
395/200.13, 200.14, 200.15, 872, 874, 877,
292, 298, 305, 182.02, 200.79, 200.53,
200.65, 200.67, 200.68, 200.72, 200.55;
370/236

[56] References Cited

U.S. PATENT DOCUMENTS

| 5,606,669 | 2/1997 | Bertin et al. | ................ | 395/200.53 |
| 5,630,184 | 5/1997 | Roper et al. | ................ | 395/200.72 |

OTHER PUBLICATIONS

Perlman, "An Algorithm for Distributed Computation of a Spanning Tree in an Extended LAN", 1985, ACM-0-89791-164-4/85/0009/0044$00.75, pp. 44-53.

"IEEE Standards for Local and Metropolitan Area Networks: Media Access Control (MAC) Bridges", Technical Committee on Computer Communication of the IEEE Computer Society, 1991, Std 802.ID-1990, pp. 49-107 and 170-176.

Perlman, et al. "Pitfalls in the Design of Distributed Routing Algorithms", 1988, ACM 0-89792-279-9/88/008/0043, pp. 43-54.

Bielkowicz, et al. "A Loop-Detect Packet based self stabilizing Bridge Protocol for Extended LANS", Computer Communication Review, vol. 19m, No. 5, ISSN #:0146-4833, Oct. 1989, pp. 73-81.

*Primary Examiner*—Mark H. Rinehart
*Attorney, Agent, or Firm*—Wilson, Sonsini, Goodrich & Rosati

[57] ABSTRACT

Resources for computing an active network topology in a system having a plurality of ports coupled to respective local area networks include a protocol entity coupled to the plurality of ports which communicates with protocol entities in other systems on the networks to establish the active network topology. Port state logic, coupled with the protocol entity and the plurality of ports establishes active network states for the plurality of ports. The active network states include a first network state for forwarding data and a second network state for blocking data, wherein a transition from a first network state to a second network state is executed after receiving information from the protocol entity indicating a change to the second network state. A transition from the second network state back to the first network state is executed upon expiry of a waiting interval after receiving information from the protocol entity indicating a change to the first network state, unless information indicating a change to the first network state is received within a forgetting interval after a change from the first network state to the second network state. If the information indicating such change is received prior to expiry of the forgetting interval, then the transition is executed immediately.

25 Claims, 4 Drawing Sheets

B2 TIES OUT B1 (AFTER B1 OFF-LINE)

FIG. 3C

ACTIVE TOPOLOGY WITH B2 ROOT

ACTIVE TOPOLOGY MAINTENANCE IN RECONFIGURING BRIDGED LOCAL AREA NETWORKS WITH STATE TRANSITION WITH FORGETTING INTERVAL

BACKGROUND OF THE INVENTION

1. Field of the Invention

The present invention relates to protocols which compute network topologies for interconnected local area networks, and more particularly to an extension of distributed topology protocols such as the Spanning Tree Algorithm used in standard bridged local area networks.

2. Description of Related Art

Media Access Control (MAC) bridges may be used to connect individual local area networks (LANs) to form a bridged local area network. These bridges maintain a simply connected active topology to prevent the duplication or misordering of frames transmitted between stations attached to the bridged local area network. IEEE Std. 802.ID-1990 of which the inventor of the present invention was a principal editor, describes the operation of MAC bridges in general and the operation of a Spanning Tree Algorithm and Protocol which is used to maintain a fully and simply connected active topology despite the unpredictable addition and removal of bridges to and from the network.

A bridge connects to LANs through its ports. The Spanning Tree Algorithm maintains loop free connectivity of the bridged local area network by selecting some bridge ports to forward frames, and others to block or not forward. Since incorrect selection of a port to forward frames could lead to loops in the network, which in turn could lead to network overload or protocol malfunction, the algorithm takes care to avoid such errors. The algorithm is distributed and its design recognizes the delays in frame and message propagation between bridges. If information is received by any bridge that suggests that one of its ports should block, the transition to blocking state is actioned immediately, whereas a transition to forwarding state is delayed, typically for a 30 second period. Thus even temporary receipt of information that indicates blocking could cause a loss of service to stations attached to the network for this period.

The original published description of the Spanning Tree Algorithm (Perlman, probably 1984) included a waiting period while the bridge port continued to forward, following the receipt of information that would cause a bridge port to block. During this period better information might be received that would maintain the port in a forwarding state. No known implementation of the algorithm includes this provision. It has the disadvantages of (a) delaying detection of a genuine loop, which might be caused by the addition of a new component (bridge, LAN repeater, or physical link) to the network and (b) necessitating a longer period for transition of a bridge port from a blocking state to a forwarding state in the event of a required reconfiguration in the active topology following removal, failure, or addition or a new network component.

The possibility of a temporary 'glitch' in Spanning Tree protocol information leading to loss of service for periods of 30 seconds or so is a recognized problem. It is possible for an administrator to arrange the parameters of the Spanning Tree Algorithm—the priorities of bridges and bridge ports, and the costs associated with ports and connections—to avoid or minimize 'glitches.' However, this procedure is tedious, not widely understood, detracts from the otherwise 'plug and play' attributes of the algorithm and of bridged local area networks in general, and requires coordination of the administration of the entire network. For this latter reason, it is often recommended that the advantages of automatic configuration and loop detection, which the algorithm provides, be dispensed with when connecting remotely bridged sites using wide area data transmission services. In these cases, it is deemed more important that configuration changes under control of one administrator at one site not cause 'glitches' and consequent loss of service for a longer period at another site under control of another administrator who may not be informed of the change.

SUMMARY OF THE INVENTION

The present invention does not include a waiting period prior to transition of a bridge port into a blocking state. Rather it provides for an improvement to the basic Spanning Tree Algorithm and Protocol to include recognition of an initial period in blocking state during which an immediate return to forwarding is permissible without looping, duplication or misordering of frames.

Thus bridges in a bridged network avoid putting their ports into the blocking state of the standard and consequently waiting for the full Forward Delay time(s) before service is resumed simply because there has been a protocol information race.

Further, the invention reduces unintended denial of service effects in bridged networks crossing administrative domains, e.g. on multiple sites, thus making a single auto-configuring Spanning Tree an acceptable solution.

Thus, the present invention can be characterized as resources for computing an active network topology in a system having a plurality of ports coupled to a network. The resources include a protocol entity which is coupled to the plurality of ports, and which communicates with protocol entities in other systems on the network to establish the active network topology. Port state logic, coupled with the protocol entity and the plurality of ports is included in the resources. The state logic establishes active network states for the plurality of ports. The active network states include a first network state and a second network state, wherein a transition from a first network state to a second network state is executed after receiving, or in a preferred system, upon receiving, information from the protocol entity indicating a change to the second network state. A transition from the second network state back to the first network state is executed upon expiry of a waiting interval after receiving information from the protocol entity indicating a change to the first network state, unless information indicating a change to the first network state is received within a "forgetting" interval after a change from the first network state to the second network state. If the information indicating a change to the first network state is received during the forgetting interval, then the transition is executed immediately.

The forgetting interval is long enough to ensure that systems in the network operating under the network protocol normally (as explained below) will not begin transferring data using a new active topology until after expiry of the forgetting interval after a change to the second network state from the first network state.

In the preferred system, the protocol entity executes the Spanning Tree Algorithm as set out in the IEEE 802.1D standard for bridged local area networks. A bridge in the first network state acts to forward data received at the port, and the second network state acts to block data received at the port. The second network state includes a plurality of transitional states referred to in the standard as the blocking state, the listening state, and the learning state. In addition, according to the present invention, a transitional "forgetting" state is added between the first network state, and the blocking state in the standard. A forgetting transitional state provides a mechanism for a return to the first network state upon receiving information indicating a change to the first network state within the forgetting interval, thereby bypassing other transitional states. After expiry of the forgetting interval in the forgetting state, the port state logic causes a transition to the blocking state of the plurality of transitional states in the second network state.

Also, according to the Spanning Tree Algorithm, a transition from the first network state is executed upon receipt of information indicating that a change to the blocking second network state should be executed. There are no transitional states between the forwarding state of the standard, and the transitional forgetting state.

The present invention can also be characterized as an improvement to a bridge having a plurality of ports and including a bridge protocol entity for interconnecting according to a Spanning Tree Algorithm a plurality of local area networks coupled to respective ones of the plurality of ports. The improvement comprises logic communicating with the bridge protocol entity, and coupled with the plurality of ports, which establishes active network states for the plurality of ports. The active network states are extended as described above to include the forgetting interval.

The invention according to another characterization, is a method for managing a network topology for plurality of network systems having ports bridging a plurality of local area networks. The method comprises the steps of:

managing ports on network systems using protocol resources distributed among the network systems, according to a plurality of network states, such that data is transmitted through a port in a first network state and such that data is blocked at a port in a second network state;

changing a port from the first network state to the second network state in a network system after receipt of information from the protocol resources indicating such change; and changing a port from the second network state to the first network state in a network system after expiry of a waiting interval if information from the protocol resources indicating such change is received after expiry of a forgetting interval after a change into the second network state, else changing directly into the first network state.

As discussed above, this method may be adapted for a Spanning Tree Algorithm, and particularly to Spanning Tree Algorithm executed according to the 802.1D standard.

Thus the standard IEEE 802.ID Spanning Tree Algorithm and Protocol can be extended by the addition of an additional state (the forgetting state) to the bridge port states. The forgetting state is entered from forwarding state (instead of the blocking state being entered), and the blocking state then entered from forgetting after an interval equal to the existing Forward Delay parameter. If Spanning Tree information which would cause a transition to the forwarding state is received in the forgetting state, then the former can be immediately entered without the listening and learning delays (each of Forward Delay time) being necessary. Otherwise, forgetting behaves just like blocking.

The remainder of the algorithm, and its operational parameters and their relationship are unchanged, so that a bridge implementing the improved algorithm can be added to an existing network or used to replace an old bridge.

Other aspects and advantages of the present invention can be seen upon review of the figures, the detailed description and the claims which follow.

BRIEF DESCRIPTION OF THE FIGURES

FIGS. 3A–3D illustrate operation of the bridged local area networks according to the present invention.

DETAILED DESCRIPTION

Figure 1:
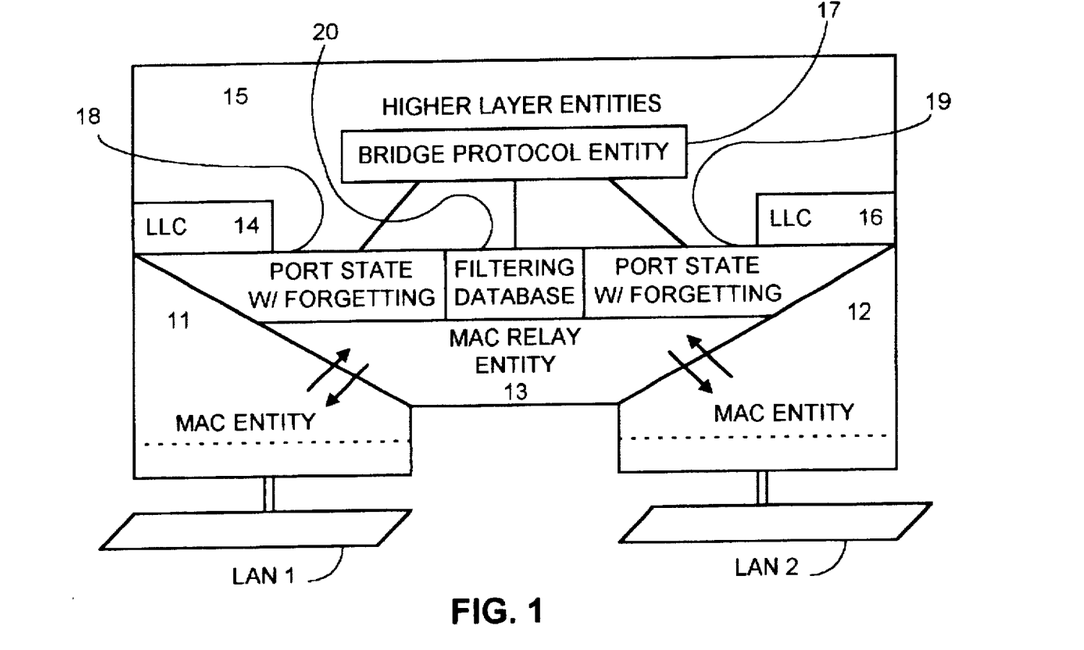
FIG. 1 is a schematic diagram of a network system bridging a plurality of local area networks according to the present invention.

A detailed description of preferred embodiments of the present invention is provided with reference to the figures. FIG. 1 illustrates the architecture of a bridge implementing the network protocol according to the present invention. The bridge includes a first media access control (MAC) entity 11 coupled to LAN 1, and a second MAC entity 12 coupled to LAN 2. A MAC relay entity 13 is coupled between the first MAC entity 11 and the second MAC entity 12. A first logical link controller (LLC) 14 is coupled between the first MAC entity 11 and higher layer entities 15 on the bridge. Similarly, a second logical link controller (LLC) 16 is coupled between the second MAC entity 12 and the higher layer entities 15. The higher layer entities include a bridge protocol entity 17.

Within the MAC relay entity, a first port state information module 18 for the first MAC entity 11, a second port state information module 19 for the second MAC entity 12, and a filtering data base 20 for the protocol are included. The MAC relay entity 13 makes decisions about forwarding or blocking data received by the first and second MAC entities 11, 12, in response to the first port state information 18, the filtering data base 20 and the second port state information 19. Bridge protocol entity 17 provides control information for maintaining the port state information and the filtering data base. According to the present invention, the first port state information 18 and second port state information 19 include a forgetting state for each port.

In operation, the bridge protocol entity 17 operates in response to bridge protocol data units BPDUs which are received through the first and second MAC entities 11, 12 by way of the first and second logical link controllers 14, 16.

This bridge architecture is adapted from the 802.1D standard as known to those of skill in the art. Thus the bridge protocol entity 17 executes a Spanning Tree Algorithm which is extended according to the present invention to include the forgetting state in each of the port state information modules 18, 19.

Figure 2:
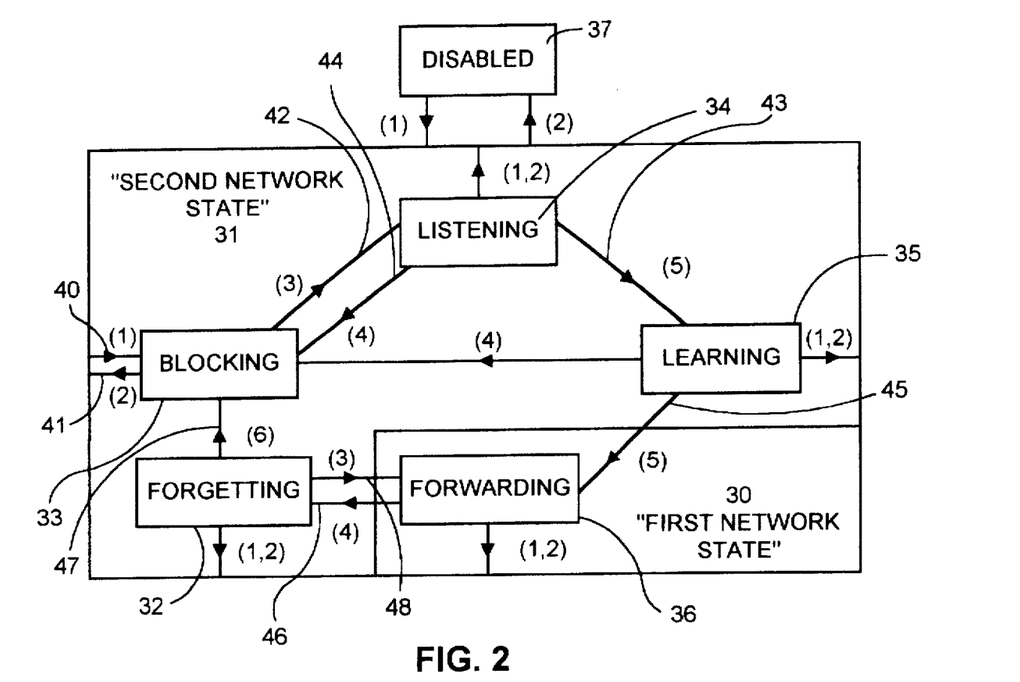
FIG. 2 is a state diagram of port state logic according to the improved protocol according to the present invention.

The port state information includes plurality of states for each port as shown in FIG. 2 according to the present invention. These states may be divided into a first network state 30 in which the MAC relay entity forwards frames for transmission through the corresponding port, and a second network state in which the MAC relay entity blocks frames from transmission though the corresponding port. As can be seen in FIG. 2, the second network state 31 includes a plurality of transitional states, including the forgetting state 32, the blocking state 33, the listening state 34, and the learning state 35. All of these transitional states except for the forgetting state 32 are included within the 802.1D standard.

The first network state 30 includes the forwarding state 36 of the 802.1D standard. The state information also includes a disabled state 37 according to the standard.

FIG. 2 includes parenthetical numerals on lines between the states indicating a basis for transitions using the same terminology as the 802.1D standard. The reasons for transition corresponding to the numerals are provided as follows:

(1) port enabled, by management or initialization.

(2) port disabled, by management or failure.

(3) algorithms selects as designated or root port.

(4) algorithms selects as not designated or root port.

(5) protocol timer expiry (forwarding timer).

(6) protocol timer expiry (forgetting timer).

These transition events are the same as set out in the 802.1D standard except for transition event (6), which corresponds to the expiry of the forgetting timer.

Thus, when the port is enabled, the state information is set initially to the blocking state (transition 40). The port stays in the blocking state until the port is disabled by management or failure (transition 41), or the bridge protocol entity 17 selects the port as the designated or root port causing a change to the listening state (transition 42). The algorithm stays in the listening state 34 until the expiry of the forwarding timer, when it changes to the learning state (transition 43). If prior to expiry of the forwarding timer, the algorithm selects the port as not the designated or root port, then the algorithm returns from the listening state to the blocking state (transition 44).

The algorithm stays in the learning state 35 until expiry of the forwarding timer a second time, at which time it changes to the forwarding state (transition 45).

The port stays in the forwarding state 36 until the algorithm selects the port as not the designated or root port, at which time it transitions to the forgetting state 32 (transition 46). The algorithm stays in the forgetting state until expiry of the forgetting timer, at which time it transitions to the blocking state 33 (transition 47). If while in the forgetting state, the algorithm selects the port as the designated or root port, then the port changes from the forgetting state 32 to the forwarding state 36 (transition 48).

If the port is enabled or disabled in any one of the listening, learning, forwarding or forgetting states, then it returns to the blocking state or the disabled state 37 as appropriate.

Figure 3A:
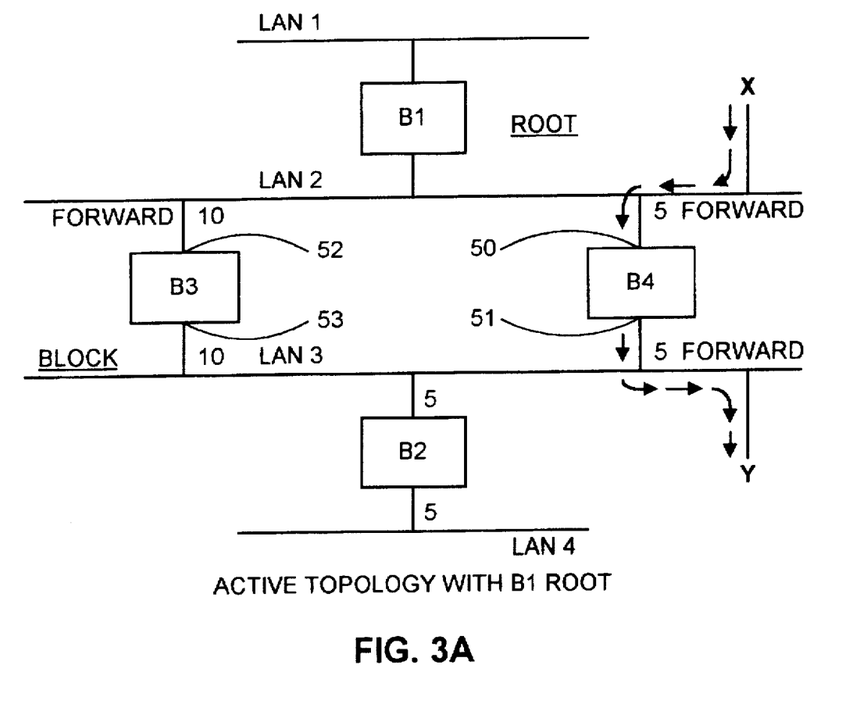
FIG. 3A illustrates a simple network including LANs connected by bridges.

FIGS. 3A–3D illustrate changing the topology in a bridged local area network according to the present invention with a simplified example. In FIG. 3A, a simple network includes LAN 1, LAN 2, LAN 3, and LAN 4. LAN 1 and LAN 2 are connected by bridge B1. LANs 2 and 3 are connected by bridge B3 and by bridge B4. LANs 3 and 4 are connected by bridge B2. End system X is coupled to LAN 2 and end system Y is coupled to LAN 3.

According to the Spanning Tree Algorithm, the bridge having the lowest identifier is selected as the root. Thus, bridge B1 is selected as the root in this network. Also, the lowest cost path is selected for interconnecting LANS in the network. Thus, bridge B4 is preferred over bridge B3 because the cost of the port 50 (5) on bridge B4 is less than the cost of port 52 (10) on bridge B3. The protocol entity in bridge B4 will therefore place both ports 50 and 51 in the forwarding state. The protocol entity in bridge B3 will place one of its ports (i.e. port 53) in the blocking state, with the other (i.e. port 52) in the forwarding state. Thus, a transmission from end system X to end system Y proceeds on LAN 2 to bridge B4 and through bridge B4 on LAN 3 to end system Y in the active topology with the root at B1.

Figure 3B:
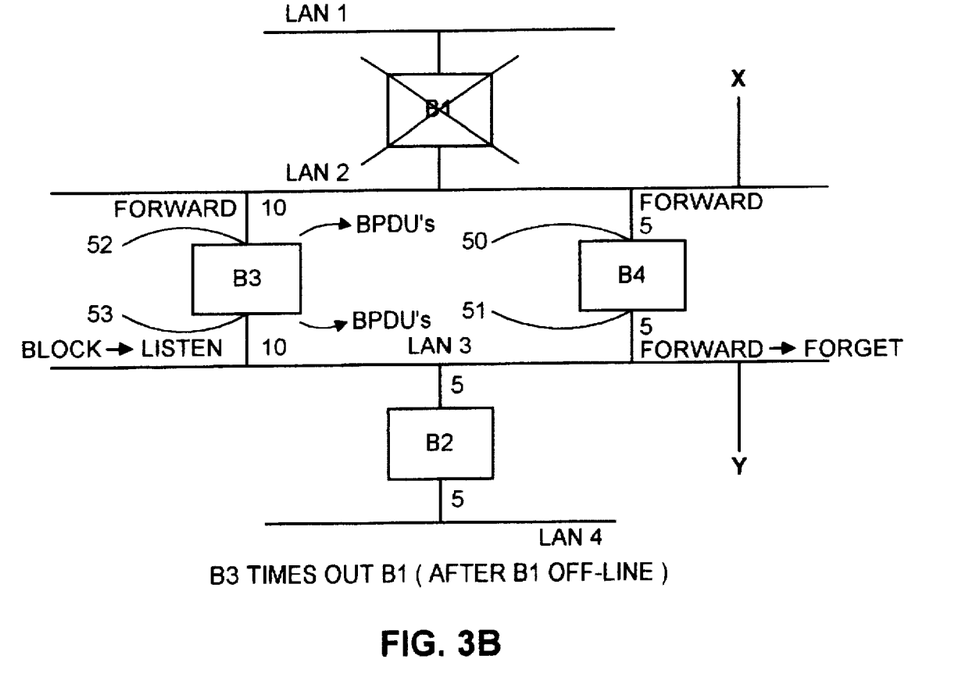
FIG. 3B illustrates the same network as FIG. 3A with bridge B1 x'd out to indicate it has been removed from the network.

In FIG. 3B the same network is illustrated. However, bridge B1 is x'd out to indicate that it has been removed from the network. The protocol entities in the bridges will time out on the B1 root configuration in a random order. In FIG. 3B, an example is provided in which bridge B3 is the first one to time out on the active topology with a B1 root. In this case, B3 will react as if it were the root and begin sending out BPDUs on all of its ports. B4 will receive the BPDUs, and because B3 has a lower bridge identifier than bridge B4, B4 will accept the BPDUs and begin transition to a new active topology.

In FIG. 3B, when bridge B3 starts sending out the BPDUs, port 53 on bridge B3 will begin executing a transition to the forwarding state by changing to the transitional listening state. Similarly, a port (e.g. port 51) on bridge B4 will transition directly from a forwarding state to the forgetting state.

Figure 3C:
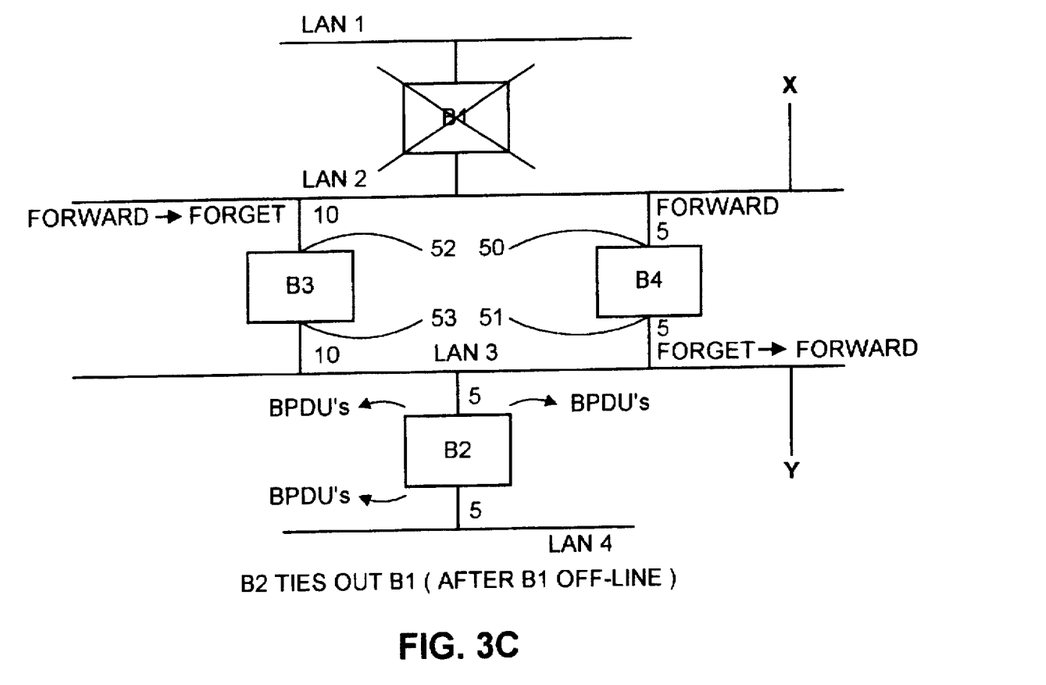
FIG. 3C illustrates how network topology is affected after B2 times out on the B1 root.

In FIG. 3C, it can be seen how the network topology is affected after bridge B2 times out on the B1 root. In this case, bridge B2 will begin sending out BPDUs on all of its ports. Because bridge B2 has a lower bridge identifier than bridge B3, the protocol entity in bridge B3 will indicate to port 52 that it is no longer the designated or root port. In this case, port 52 will change to the forgetting state. Port 53 remains in the listening state pending expiry of the Forward Delay. Similarly, bridge B4 will accept the BPDUs from bridge B2 as dominating the earlier received BPDUs from bridge B3. The protocol entity in bridge B4 will thus inform port 51 that is should change to a designated port. In this case, it will transition immediately back to the forwarding state from the forgetting state, because the event happens prior to expiry to the forgetting interval. Port 50 remains unchanged.

Figure 3D:
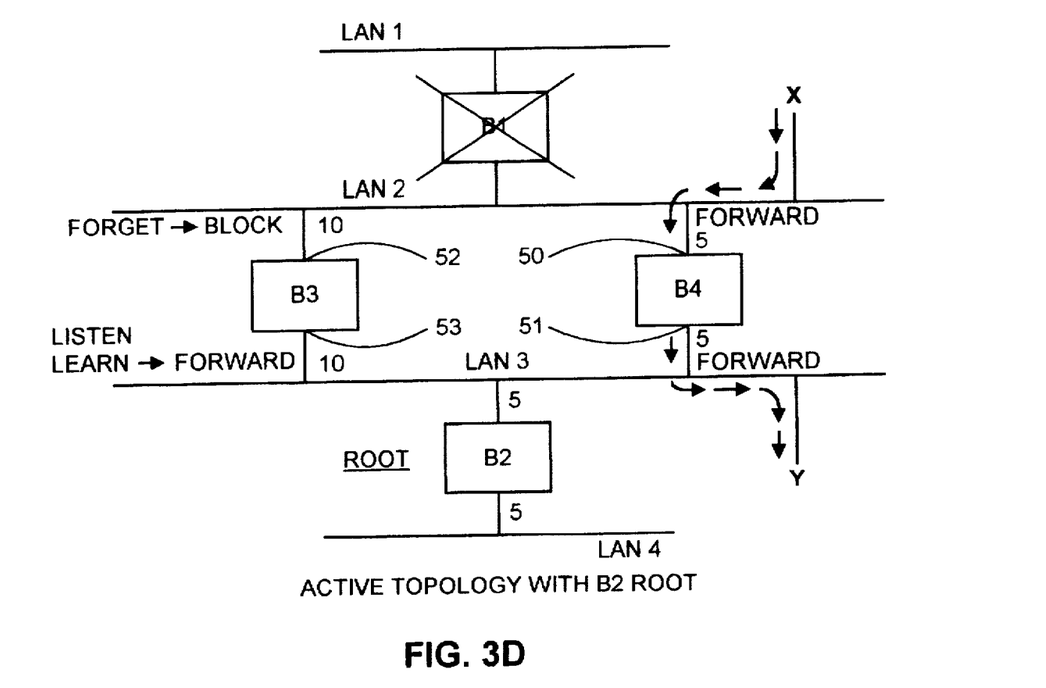
FIG. 3D illustrates settling of the topology of the network with the B2 root.

FIG. 3D illustrates settling of the topology of the network with the B2 root. Thus, bridge B4 settles with port 50 in the forwarding state and port 51 in the forwarding state. Bridge B3 will settle with port 52 transitioning to the blocking state after expiry of the forgetting interval, and port 53 transitioning through the listening state and the learning state to the forwarding state after expiry of the Forward Delay in both of the transitional states.

As can be seen, a transmission from end system X to end system Y can be completed through bridge B4 even while the topology is settling in bridge B3, as port 51 is returned quickly to the forwarding state without going through the transitional blocking, listening and learning states.

The length of the forgetting interval can be determined according to the needs of the particular protocol being executed. IEEE Std 802.1D-1990, Appendix B describes the calculation method for Spanning Tree Algorithm timer parameters. Clause B3.8.2 describes the calculation of the delay necessary before a bridge adopts a new active topology, i.e., starts forwarding frames on a port which was previously blocking, to ensure that there are no longer any frames in the network that were being forwarded on the previous active topology. This delay, 2×Forward Delay, where Forward Delay is a parameter of the standard Spanning Tree Algorithm and Protocol, is calculated for a worst case scenario where bridges maximally far apart in the bridged local area network adopt a new active topology following removal of the root bridge from the network:

$$2 \times fwd\_d = msg\_ao + msg\_prop + bt\_d + life$$

where:

fwd_d=Forward Delay msg_ao=maximum Message Age overestimate msg_prop=maximum Bridge Protocol Message propagation time bt_d=maximum bridge transit delay life=maximum frame lifetime The present invention is based on the observation that reversion to a previous active topology differs from adoption of a new active topology when (non exclusive) frames are not yet being forwarded on the new active topology. For a bridge to revert immediately to a prior active topology (or the section thereof represented by the bridge port in a forwarding state) it is necessary to be sure (to within the probabilities used by the basic algorithm) that there are no frames in the network that were or are being forwarded in a newer active topology, i.e. that a new active topology has not been adopted by any bridge. Using the worst case described in B3.8.2, note that msg_ao represents the worst case time differences between two bridges in the network recognizing the need for a new active topology, that protocol information from the later of the pair to recognize this will be received by the other within msg_prop, and that this permits the later bridge to be sure (on recognizing the new topology) that the earlier still has a period of msg_prop+bt_d+life (or 2×fwd_d−msg_ao) to run before it attempts to use the new active topology, which allows the later bridge to transition its bridge port directly back to forwarding upon receiving any information to that effect during this period. For the parameters derived in Appendix B and used in B3.8.2:

fwd_d=15 seconds msg_ao=6 seconds msg_prop=14 seconds bt_d=1 second life=7.5 seconds This leaves an interval of around 23 seconds in which direct reversion is permitted. It is convenient to approximate this by Forward Delay (15 seconds in this case) as this parameter is conveyed in the Spanning Tree Protocol. Since the times used in the calculation are maxima and are highly unlikely to be approached in practice, this should ensure that 'glitches' only cause temporary service denials of the order of differences in network transmission times and processing times, i.e. in the range 1 millisecond to 1 second—well within the retransmission time limits of higher layer protocols.

It is worth noting here, for anyone unfamiliar with reasoning about the dynamic behavior of the Spanning Tree Algorithm, that the normal simplifying assumption that one basic change has occurred in the network has been applied above. This assumption recognizes that multiple changes giving rise to successively "better" protocol information are so unlikely as to be ignorable. A less generous analysis, adding a new bridge to the network at the critical moment, might yield bt_d+life for the period during which direct reversion is allowed—approximately 8 seconds. However the entire stability of the basic algorithm depends on ignoring correlated events which inject successively improving protocol information, so the prior approach is believed to be justified.

Thus a forgetting interval of less than 23 seconds in 802.1D standard networks will ensure that bridges normally will not begin transferring data using a new active topology during the forgetting state. A forgetting interval of 15 seconds provides a good margin. A forgetting interval of 8 seconds should be quite safe.

Figure 4:
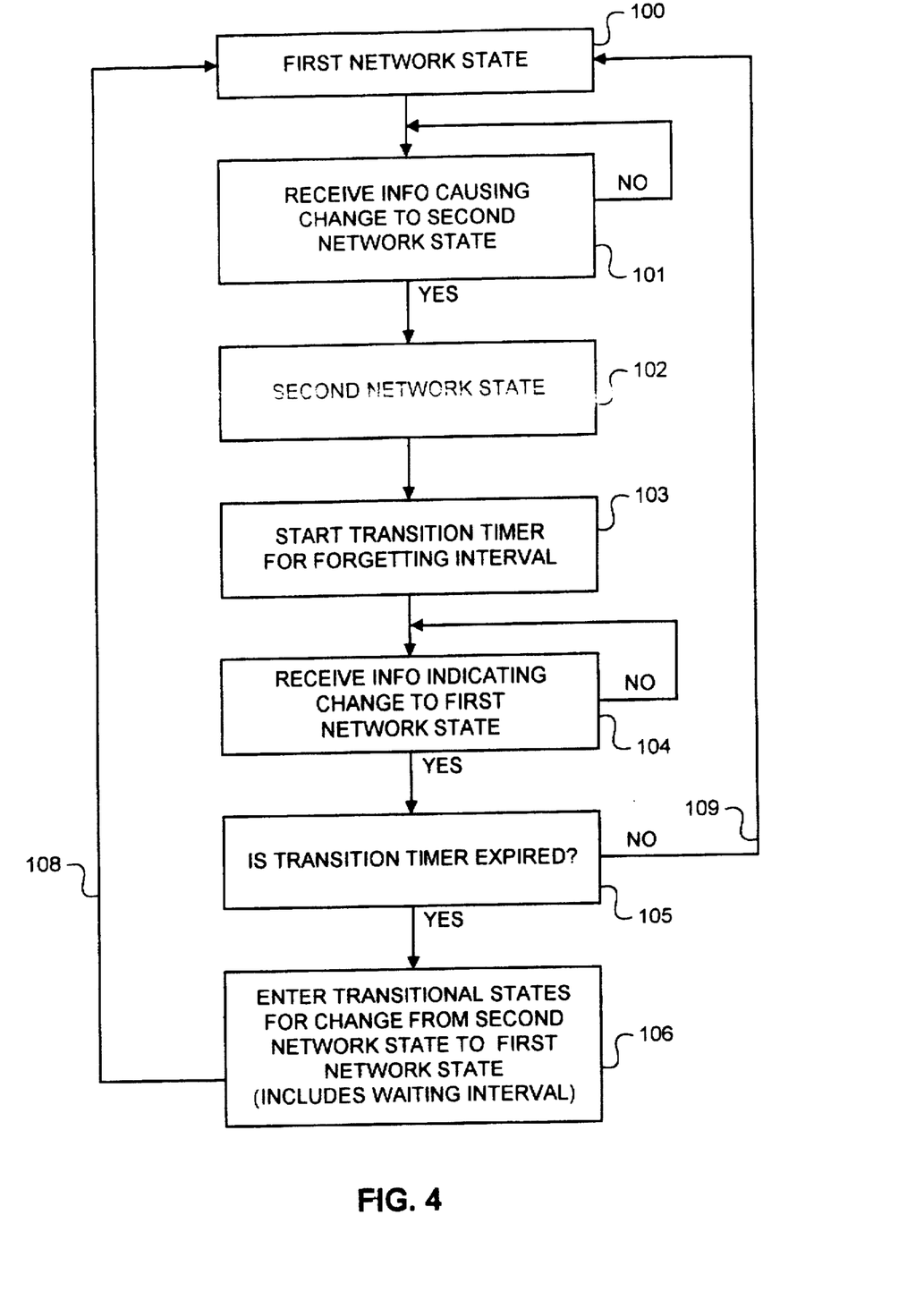
FIG. 4 is a generalized flow chart for the improved network topology protocol according to the present invention.

FIG. 4 illustrates a generalized flow chart for changing from a first network state to a second network state and back for a distributed network topology protocol according to the present invention. Thus, the algorithm begins with the port in a first network state 100. While in the first network state, the port monitors the bridge topology protocol entity for information indicating a change to the second network state (block 101). If none is received, then the algorithm loops and remains in the first network state. If such information is received, then the algorithm executes a change upon receipt of such information to the second network state (block 102). At that point, a transition timer is started (block 103). Next, the bridge protocol entity information is monitored for information indicating a change to the first network state (block 104). If this is not received, then the algorithm remains in the second network state. If such information is received, then the transition timer is tested for expiration (block 105). If the transition timer has not expired, then the port is changed directly to the first network state (100) as indicated by line 109. If the transition timer has expired, then transitional states are entered for change from the second network state to the first network state (block 106). Depending on events which occur during the transitional states, the port may stay in the second network state, or it may change to the first network state as indicated by line 108. Thus, the forgetting interval technique can be used for any algorithm managing a network topology for interconnected LANS according to the basic method of FIG. 4.

Accordingly, an improvement to the standard Spanning Tree Algorithm and Protocol for configuring bridged networks which insures that topology changes in one part of the network do not cause unnecessary service outages in other parts is provided. The improvement does not require additional administrative procedures, and is fully compatible and interoperable with equipment not implementing the improvement. In addition, the method may also be generalized to other protocols managing network topologies, and particularly to distributed network topology protocols.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. In a system having a plurality of ports coupled to a network, resources for computing an active network topology comprising:

a protocol entity coupled to the plurality of ports which communicates with a protocol entity in other systems on the network to establish the active network topology; and port state logic, coupled with the protocol entity and the plurality of ports, which establishes active network states for the plurality of ports, the active network states including a first network state and a second network state, wherein a transition from a first network state to a second network state is executed after receiving information from the protocol entity indicating a change to the second network state, and a transition from the second network state to the first network state is executed;

upon expiry of a waiting interval in the second network state if information from the protocol entity indicating such change is received after expiry of a forgetting interval, the forgetting interval starting in response to the transition to the second network states else, if information from the protocol entity indicating such change is received before expiry of the forgetting interval, changing directly to the first network state.

2. The resources of claim 1, wherein the forgetting interval is long enough to ensure that systems in the network normally will not begin transferring data using a new active topology until after expiry of the forgetting interval after notification of a change to the second network state from the first network state.

3. The resources of claim 1, wherein the second network state includes a plurality of transitional states for transition to the first network states including a forgetting state in which a transition to the first network state is executed upon receiving information indicating a change to the first network state, thereby bypassing other transitional states in the plurality of transitional states, and wherein the port state logic includes logic for changing after expiry of the forgetting interval out of the forgetting state into another one of the plurality of transitional states.

4. The resources of claim 1, wherein the protocol entity executes a Spanning Tree algorith.

5. The resources of claim 4, wherein the forgetting interval is determined by a Forward Delay parameter of the Spanning Tree Algorithm.

6. The resources of claim 1, wherein a port in first network state forwards received data, and a port in the second network state blocks received data.

7. The resources of claim 1, wherein the port state logic includes logic which executes a transition from the first network state to the second network state upon receiving information indicating a change to the second network state.

8. In a system having a plurality of ports coupled to respective local area networks, resources for computing an active network topology for bridging the local area networks into a bridged network, comprising:

a protocol entity coupled to the plurality of ports which communicates with protocol entities in other systems on the bridged network to establish the active network topology according to a Spanning Tree algorithm;

port state logic communicating with the bridge protocol entity and coupled with the plurality of ports, which establishes active network states for the plurality of ports, the active network states including a first network state in which data received is forwarded and a second network state in which data received is blocked, wherein a transition from the first network state to the second network state is executed upon receiving information from the protocol entity indicating a change to the second network state, and a transition from the second network state to the first network state is executed upon expiry of a waiting interval if information from the protocol entity indicating such change is received after expiry of a forgetting interval from the transition to the second network state, else changing directly to the first network state.

9. The resources of claim 8, wherein the forgetting interval is long enough to ensure that systems in the network operating under the Spanning Tree Algorithm normally will not begin transferring data using a new active topology until after expiry of the forgetting interval after a change of a port to the second network state.

10. The resources of claim 8, wherein the forgetting interval is determined by a Forward Delay parameter of the Spanning Tree Algorithm.

11. The resources of claim 8, wherein the second network state includes a plurality of transitional states for transition to the first network state, including a forgetting state in which a transition to the first network state is executed upon receiving information indicating a change to the first network state, thereby bypassing other transitional states in the plurality of transitional states, and wherein the port state logic includes logic for changing after expiry of the forgetting interval out of the forgetting state into another one of the plurality of transitional states.

12. In a bridge having a plurality of ports and including a bridge protocol entity for interconnecting according to a Spanning Tree Algorithm a plurality of local area networks coupled to respective ones of the plurality of ports, an improvement comprising logic communicating with the bridge protocol entity and coupled with the plurality of ports, which establishes active network states for the plurality of ports, the active network states including a first network state in which data is forwarded through the port and a second network state in which data is blocked at the port, wherein a transition from the first network state to the second network state is executed upon receiving information from the protocol entity indicating a change to the second network state, and a transition from the second network state to the first network state is executed upon expity of a waiting interval in the second network state after receiving information from the protocol entity indicating a change to the first network state, unless information is received indicating a change to the first network state is received within a forgetting interval after a change from the first network state to the second network state.

13. The improvement of claim 12, wherein the forgetting interval is long enough to ensure that systems in the network operating under the Spanning Tree Algorithm normally will not begin transferring data using a new active topology until after expiry of the forgetting interval after a change of a port to the second network state.

14. The improvement of claim 12, wherein the forgetting interval is determined by a Forward Delay parameter of the Spanning Tree Algorithm.

15. The improvement of claim 12, wherein the second network state includes a plurality of transitional states for transition to the first network state, including a forgetting state in which a transition to the first network state is executed upon receiving information indicating a change to the first network state, thereby bypassing other transitional states in the plurality of transitional states, and wherein the port state logic includes logic for changing after expiry of the forgetting interval out of the forgetting state into another one of the plurality of transitional states.

16. A method for managing a network topology for a plurality of network systems having ports bridging a plurality of local area networks, comprising:

> managing ports on the network systems using protocol resources distributed among the network systems, according to a plurality of network states, such that data is transmitted through a port in a first network state, and such that data is blocked at a port in a second network state;
>
> changing a port from the first network state to the second network state in a network system after receipt of information from the protocol resources indicating such change; and
>
> changing a port from the second network state to the first network state in a network system after expiry of a waiting interval if information from the protocol resources indicating such change is received after expiry of a forgetting interval after a change into the second network state, else changing directly to the first network state.

17. The method of claim 16, wherein the protocol resources execute a Spanning Tree algorithm.

18. The method of claim 17, wherein the forgetting interval is determined by a Forward Delay parameter of the Spanning Tree Algorithm.

19. The method of claim 16, wherein the forgetting interval is long enough to ensure that the network systems normally will not begin transferring data using a new topology until after expiry of the forgetting interval after a change of a port to the second network state.

20. The method of claim 16, wherein the second network state includes a plurality of transitional states for transition to the first network state, including a forgetting state in which a change to the first network state is executed upon receiving information indicating such change, and the step of changing a port from the first network state to the second network state includes changing to the forgetting state, and changing after expiry of the forgetting interval out of the forgetting state into another one of the plurality of transitional states, so that transitional states in the plurality of transitional states other than the forgetting state are bypassed if information from the protocol resources indicating such change is received before expiry of the forgetting interval after a change into the forgetting state.

21. The method of claim 16, wherein the step of changing aport from the first network state to the second network state in a network system occurs upon receipt of information from the protocol resources indicating such change.

22. A method for managing a network topology for a plurality of network systems having ports bridging a plurality of local area networks, comprising:

> managing ports on the network systems using protocol resources distributed among the network systems executing a Spanning Tree algorithm, according to a plurality of network states, such that data is transmitted through a port in a first network state, and such that data is blocked at a port in a second network state, and wherein the second network state includes a plurality of transitional states for transition to the first network state, including a forgetting state in which a change to the first network state is executed upon receiving information indicating such change;
>
> changing a port from the first network state to the forgetting state of the second network state in a network system after receipt of information from the protocol resources indicating such change;
>
> changing after expiry of a forgetting interval out of the forgetting state into a designated one of the plurality of transitional states of the second network state; and
>
> changing a port from the designated one of the plurality of transitional states through other transitional states in the plurality of transitional states of the second network state to the first network state in a network system if information from the protocol resources indicating such change is received while the port is in the designated one of the plurality of transitional states, so that the plurality of transitional states other than the forgetting state are bypassed if information indicating a change to the first network state is received before expiry of the forgetting interval after a change into the forgetting state.

23. The method of claim 22, wherein the forgetting interval is long enough to ensure that the network systems normally will not begin transferring data using a new topology until after expiry of the forgetting interval after a change of a port to the second network state.

24. The method of claim 22 wherein the forgetting interval is determined by a Forward Delay parameter of the Spanning Tree Algorithm.

25. The method of claim 22, wherein the step of changing a port from the first network state to the forgetting state of the second network state in a network system occurs upon receipt of information from the protocol resources indicating such change.

* * * * *